US012677021B2

(12) United States Patent　　　　　　　(10) Patent No.: US 12,677,021 B2
Hock　　　　　　　　　　　　　　　　　(45) Date of Patent: Jul. 7, 2026

(54) METHOD FOR A TRANSPORTATION APPARATUS FOR USING A TOUCH-SENSITIVE INPUT DEVICE FOR A STREAMING BOX

(71) Applicant: Bayerische Motoren Werke Aktiengesellschaft, Munich (DE)

(72) Inventor: Bertram Hock, Kirchdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 56 days.

(21) Appl. No.: 18/726,246

(22) PCT Filed: Nov. 15, 2022

(86) PCT No.: PCT/DE2022/100851
§ 371 (c)(1),
(2) Date: Jul. 2, 2024

(87) PCT Pub. No.: WO2023/131367
PCT Pub. Date: Jul. 13, 2023

(65) Prior Publication Data
US 2025/0071364 A1　　Feb. 27, 2025

(30) Foreign Application Priority Data

Jan. 4, 2022　(DE) ..................... 10 2022 100 137.7

(51) Int. Cl.
*H04N 21/414*　　　(2011.01)
*B60K 35/10*　　　(2024.01)
(Continued)

(52) U.S. Cl.
CPC ....... *H04N 21/41422* (2013.01); *B60K 35/10* (2024.01); *B60K 35/22* (2024.01); *B60K 35/81* (2024.01); *G06F 3/0488* (2013.01)

(58) Field of Classification Search
CPC ............. H04N 21/41422; H04N 21/40; H04N 21/472; H04N 21/41265; B60K 35/10;
(Continued)

(56) References Cited

U.S. PATENT DOCUMENTS

2015/0222947 A1 * 8/2015 Oh ................... H04N 21/41422
2017/0305271 A1 10/2017 Bieger et al.
(Continued)

FOREIGN PATENT DOCUMENTS

DE　　10 2004 061 660 B3　　2/2006
DE　　10 2014 220 535 A1　　4/2016
(Continued)

OTHER PUBLICATIONS

International Search Report (PCT/ISA/210) issued in PCT Application No. PCT/DE2022/100851 dated Feb. 2, 2023 with English translation (5 pages).
(Continued)

*Primary Examiner* — Anthony Bantamoi
(74) *Attorney, Agent, or Firm* — Crowell & Moring LLP

(57)　　　　ABSTRACT

A method for using a touch-sensitive input device arranged in a transportation apparatus and for displaying display content transmitted from a streaming box arranged in the transportation apparatus by way a display device arranged in the transportation apparatus is provided. The method includes detecting input data of a user input on the touch-sensitive input device by way of the touch-sensitive input device, ascertaining a display element, which corresponds to the input data of the user input, of a first display content and/or of a specified command, which corresponds to the input data of the user input, by way of the streaming box, and in response thereto, displaying a second display content transmitted from the streaming box by way of the display device of the transportation apparatus.

17 Claims, 2 Drawing Sheets

(51) Int. Cl.
    *B60K 35/22*        (2024.01)
    *B60K 35/81*        (2024.01)
    *G06F 3/0488*      (2022.01)
(58) Field of Classification Search
    CPC .... B60K 35/22; B60K 35/81; B60K 2360/11;
        B60K 2360/143; G06F 3/0488; G06F
        2203/04808; G06F 3/0482; G06F
        3/04842; G06F 3/04883; G06F 3/147;
        G06F 3/048; G09G 2380/10
    See application file for complete search history.

(56)         References Cited

U.S. PATENT DOCUMENTS

| | | |
|---|---|---|
| 2017/0351422 A1 | 12/2017 | Wild et al. |
| 2017/0371618 A1 | 12/2017 | Trapp et al. |
| 2018/0069930 A1* | 3/2018 | Brusco ................. H04L 67/125 |
| 2018/0137103 A1 | 5/2018 | Watson et al. |
| 2022/0197457 A1 | 6/2022 | Strassberger |

FOREIGN PATENT DOCUMENTS

| | | | |
|---|---|---|---|
| DE | 10 2016 221 072 A1 | 4/2018 | |
| DE | 10 2017 126 588 A1 | 5/2018 | |
| DE | 10 2019 118 189 A1 | 1/2021 | |
| EP | 2 990 251 B1 | 1/2018 | |
| EP | 3 269 151 B1 | 8/2019 | |
| EP | 3 237 249 B1 | 4/2020 | |
| EP | 3817349 A1 * | 5/2021 | ........ H04M 1/72409 |

OTHER PUBLICATIONS

German-language Written Opinion (PCT/ISA/237) issued in PCT Application No. PCT/DE2022/100851 dated Feb. 2, 2023 with English translation (14 pages).
German-language Search Report issued in German Application No. 10 2022 100 137.7 dated Oct. 12, 2022 with partial English translation (11 pages).

* cited by examiner

METHOD FOR A TRANSPORTATION APPARATUS FOR USING A TOUCH-SENSITIVE INPUT DEVICE FOR A STREAMING BOX

BACKGROUND AND SUMMARY

The present invention relates to a method for using a touch-sensitive input device arranged in a transportation apparatus and for displaying display content, transferred from a streaming box arranged in the transportation apparatus, by way of a display device for a streaming box arranged in the transportation apparatus.

In the prior art, streaming boxes such as Apple TV and Fire TV are known, which are also known as "streaming media adapters" and relate to an audio-visual device in consumer electronics, which is connected to a home stereo system, a television or other output device and is networked with a personal computer or router. The streaming boxes can be controlled by an associated remote control unit.

The remote control unit is a small movable object and can therefore easily be lost. In the event of an accident, the remote control unit in a transportation apparatus can move in undefined directions, causing injury to passengers and damage to other objects within the transportation apparatus. The control of audio/video and multimedia content in a transportation apparatus is usually carried out by way of hardware-designed controls and/or by way of touch-sensitive interfaces.

It is an object of the present invention to provide a convenient control of a streaming box in a transportation apparatus.

The aforementioned object is achieved according to embodiments of the invention by a method having a plurality of steps, so that a touch-sensitive input device arranged in a transportation apparatus is used and display content transferred from a streaming box arranged in the transportation apparatus is displayed by way of a display device arranged in the transportation apparatus. The touchpad (remote) from the touch-sensitive input device or in conjunction with the display device can also be referred to as a "touchscreen" or "touchscreen display". The user can perform a user input on the touch-sensitive input device, whereupon input data corresponding to the user input is generated. The input data is generated by way of the touch-sensitive input device. Further, according to the input data of the user input, a display element of a first display content and/or a predetermined command is/are determined by way of the streaming box. For example, the user can tap on a display element, in particular a button, of the first display content by a touch with a finger to play a video or to display other display content, in particular in the form of a web page. Alternatively, the user can trigger a predefined command to display previous or following display content by dragging with one or two fingers to the left or right. The streaming box facilitates a comparison between the input data and data of the first display content and/or the predefined command. In response to the preceding steps, a second display content item, which is transferred from the streaming box, is displayed by way of the display device of the transportation apparatus. The determination via the streaming box ensures efficient analysis, identification and execution according to user input.

The method can preferably comprise further steps. The second display content can be requested from a data source using the streaming box. The data source may be a television program or an online service, such as a video portal, as well as being locally provided in the transportation apparatus. The second display content from the data source is also received via the streaming box. The second display content is then transferred to the display device. These steps can be performed automatically using the streaming box.

Preferably, the input data represents at least one touch position or multiple touch positions, in particular one coordinate or multiple coordinates, or a touch track. The user input for the input data is carried out, for example, by touching/actuating the touch-sensitive input device by way of at least one finger of the user, in particular by way of a one-finger tap gesture, a one-finger swipe gesture, a two-finger drag gesture, a rotation and/or a multi-finger swipe gesture to provide the input data.

Preferably, the input data is transferred to a rear-seat entertainment control unit, hereafter referred to as the RSE control unit, and/or the streaming box. Furthermore, the input data can be transferred from the touch-sensitive input device to the streaming box via the RSE control unit. For example, coordinates, in particular X-Y coordinates, and/or classes of gestures and/or positions, pressure, speed and/or vector can be transferred.

Data is preferably transmitted between two elements from the touch-sensitive input device, the RSE control unit, the streaming box and the data source by way of a wireless local computer network or a cable, in particular a LAN cable, USB cable or HDMI cable. In particular, the streaming box can be connected to a WLAN/WiFi provided in the transportation apparatus in order to transmit data between the streaming box and the data source. Alternatively or in addition, this communication can be carried out via Bluetooth.

Preferably, the input data is transferred from the RSE control unit to the streaming box by way of a cable, in particular a LAN cable, USB cable or HDMI cable. In addition or alternatively, the second display content can be transferred from the streaming box to the RSE control unit by way of a cable, in particular a LAN cable, USB cable or HDMI cable, and also in particular the same cable.

Preferably, the second display content is transferred from the data source to the streaming box by way of the wireless local computer network, in particular WLAN and/or WiFi. As a result, data transmission between the streaming box and the RSE control unit can be different from data transmission between the streaming box and the data source, thus reducing the load on the WLAN/WiFi. However, there may be a fixed communication between the streaming box and the data source, which will not be changed. Parallel communication between the RSE control unit and the streaming box then supplies the control data/touch data, optionally implemented with its own socket or port.

Preferably, the streaming box is arranged in the transportation apparatus in a fixed or removable manner. If the streaming box is fixed in the transportation apparatus, the streaming box can be securely stored. Alternatively, if the streaming box is arranged removably in the transportation apparatus, it is possible for the user to integrate a convenient and favorite streaming box him/herself and to change it as needed.

Preferably, a digitally represented temporal sequence of touch positions on the touch-sensitive input device is interpreted by way of the streaming box. The streaming box connects the data source to the input device, performs a decoding of the data from the data source and thus has the advantage of analyzing and comparing the data from the touch-sensitive input device and the data source.

Preferably, the interpretation of a digitally represented temporal sequence of touch positions on the touch-sensitive input device can be alternatively carried out by way of the RSE control unit. This interpreted data is then sent to the streaming box. This relieves the load on the streaming box, causing it to generate less heat and thus extending the readiness and product service life of the streaming box. In this case, on the one hand, the requirements on the hardware of the streaming box can be reduced. On the other hand, the streaming box can better handle other programs and/or functions without performing the interpretation.

Further details, features and advantages of the invention are derived from the following description and the figures.

DETAILED DESCRIPTION OF THE DRAWINGS

Figure 1:
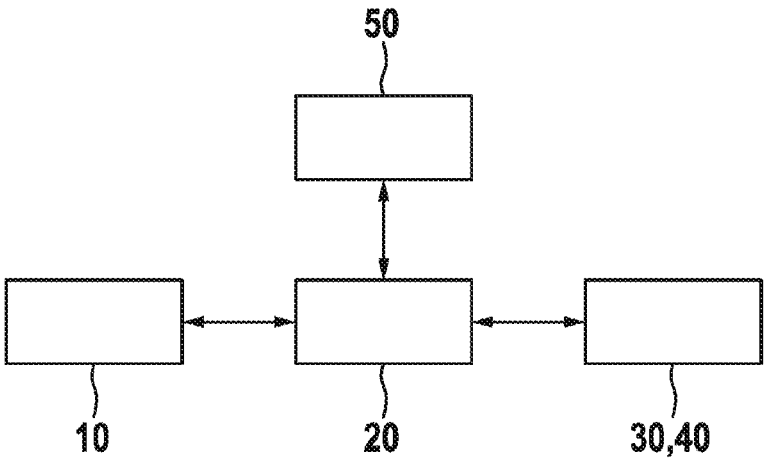
FIG. 1 shows a schematic representation of a first exemplary embodiment according to the present invention to illustrate a system having a streaming box for a transportation apparatus for using a touch-sensitive input device and for displaying display content.

FIG. 1 shows a schematic representation of a first exemplary embodiment according to the present invention to illustrate a system 1 having a streaming box 10 for a transportation apparatus, in order to use a touch-sensitive input device 30 and to display the display content on a display device 40. The system comprises a streaming box 10, an RSE control unit 20, the touch-sensitive input device 30, the display device 40 and a data source 50.

The touch-sensitive input device 30 and the display device 40 are integrated in a touchscreen. The touchscreen is connected to the RSE control unit 20 by way of information technology, in order to enable bidirectional data transmission between them. The input data is transferred from the touchscreen to the RSE control unit 20 when a user touches the touch-sensitive input device 30 to provide user input. The input data generated by the user input is analyzed by way of the RSE control unit 20 and compared with a first display content on the display device 40 in order to determine a request for a second display content. However, this is only possible for display content items that are controlled by the operating system of the RSE control unit 20 and classified as icons etc.

The RSE control unit 20 is also connected to the streaming box 10 and a data source 50 by way of information technology in order to enable bidirectional data transmission between them. Data is transmitted between the RSE control unit 20 and the streaming box 10 by way of an HDMI cable or HDMI connection. The data is transmitted between the RSE control unit 20 and the data source 50 by way of a network cable, in particular a LAN cable, or a WLAN/WiFi. The request is transferred from the RSE control unit 20 to the data source 50. After receiving the request, the data source 50 transfers the encoded data for the second display content via the RSE control unit 20 to the streaming box 10. By way of the streaming box 10, the encoded data of the second display content is decoded and the decoded data for the second display content is subsequently transferred via the RSE control unit 20 to the display device 40 in order to display the second display content on the display device 40.

Figure 2:
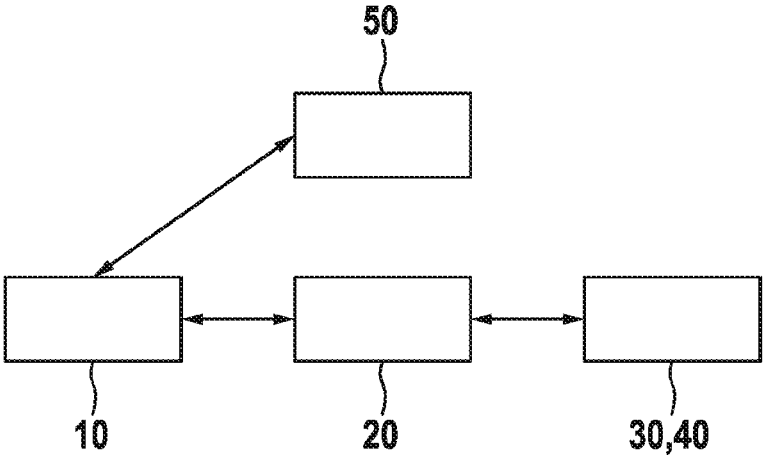
FIG. 2 shows a schematic representation of a second exemplary embodiment according to the present invention to illustrate a system having a streaming box for a transportation apparatus for using a touch-sensitive input device and for displaying display content.

FIG. 2 shows a schematic representation of a second exemplary embodiment according to the present invention to illustrate a system 2 having a streaming box 10 for a transportation apparatus, in order to use a touch-sensitive input device 30 and to display the display content on a display device 40. In contrast to the first exemplary embodiment from FIG. 1, the input data from the user input on the touch-sensitive input device 30 is captured by way of the touch-sensitive input device 30 and transferred via the RSE control unit 20 to the streaming box 10. Furthermore, the input data is analyzed by way of the streaming box 10 and in particular compared with a first display content, so that by way of the streaming box 10 a display element of the first display content corresponding to the input data is determined in order to determine the request for the second display content, and/or a predefined command corresponding to the input data of the user input is determined in order to execute the predefined command.

Furthermore, the streaming box 10 is connected via WLAN or WiFi to the data source 50 by way of information technology in order to enable bidirectional data transmission. The request is sent from the streaming box 10 to the data source 50. After receiving the request, the encoded data for the second display content is sent from the data source 50 to the streaming box 10. The streaming box 10 decodes the encoded data for the second display content and transfers the decoded data, in particular via the RSE control unit 20, to the display device 40 to display the second display content by way of the display device 40.

Figure 3:
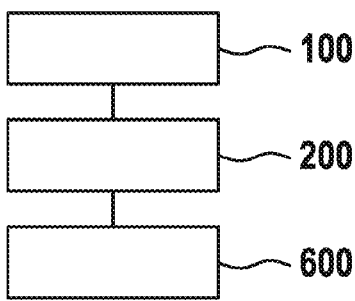
FIG. 3 shows a flow diagram illustrating steps of a first embodiment of a method according to the invention.

FIG. 3 shows a flow diagram illustrating steps 100, 200, 600 of the first embodiment of the method according to the invention. The method comprises multiple steps, according to which a touch-sensitive input device 30 which is arranged in a transportation apparatus is used, and display content, which is transferred by a streaming box 10 arranged in the transportation apparatus, is displayed by way of a display device 40 arranged in a transportation apparatus. A user input occurs when the user touches the touch-sensitive input device 30 with at least one finger. By way of the touch-sensitive input device 30, the input data of the user input is captured in step 100. Further, by way of the streaming box 10 in step 200, a display element of a first display content, the position of which corresponds to the input data of the user input, and/or a predefined command, which corresponds to the input data of the user input, are determined. In response thereto, in step 600 a second display content, which is transferred from the streaming box 10, is displayed by way of the display device 40.

Figure 4:
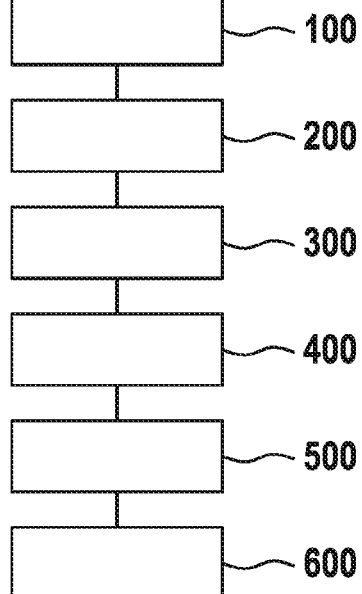
FIG. 4 shows a flow diagram illustrating steps of a second embodiment of a method according to the invention.

FIG. 4 shows a flowchart illustrating steps 100, 200, 300, 400, 500, 600 of the second embodiment of the method according to the invention. In addition to the method from FIG. 3, the method from FIG. 4 further comprises steps 300, 400, 500 between steps 200, 600 from FIG. 3. The second display content is requested from the data source 50 using the streaming box 10 in step 300. The second display content is received from the data source 50 using the streaming box 10 in step 400. The second display content is transferred to the display device 40 in step 500 and displayed there.

LIST OF REFERENCE SIGNS 10 streaming box
20 rear-seat entertainment control unit

30 touch-sensitive input device
40 display device
50 data source
100-600 method steps

The invention claimed is:

1. A method for using a touch-sensitive input device arranged in a transportation apparatus and for displaying display content, transferred from a streaming box arranged in the transportation apparatus, by way of a display device arranged in the transportation apparatus, the method comprising:

capturing input data of a user input on the touch-sensitive input device by way of the touch-sensitive input device, determining at least one of a display element of a first display content corresponding to the input data of the user input or a predefined command corresponding to the input data of the user input by way of the streaming box, and in response thereto, displaying second display content transferred from the streaming box, by way of the display device of the transportation apparatus, wherein the input data is transferred from the touch-sensitive input device via a rear-seat entertainment control unit to the streaming box, and the second display content is transferred from the streaming box via the rear-seat entertainment control unit to the display device.

2. The method according to claim 1, further comprising:

requesting the second display content from a data source by way of the streaming box, receiving the second display content from the data source by way of the streaming box, and transferring the second display content to the display device.

3. The method according to claim 1, wherein the input data represents at least one touch position or multiple touch positions or a touch track.

4. The method according to claim 3, wherein the at least one touch position or the multiple touch positions are one or more coordinates.

5. The method according to claim 1, wherein the input data is transferred to at least one of a rear-seat entertainment control unit or the streaming box.

6. The method according to claim 5, wherein the input data is transferred from the touch-sensitive input device via the rear-seat entertainment control unit to the streaming box.

7. The method according to claim 5, wherein data is transmitted between two elements from the touch-sensitive input device, the rear-seat entertainment control unit, the streaming box and the data source by way of a wireless local computer network, by way of a plug connection or a first cable.

8. The method according to claim 7, wherein the first cable is a LAN cable, a USB cable or an HDMI cable.

9. The method according to claim 7, wherein the input data is transferred from the rear-seat entertainment control unit to the streaming box by way of a second cable, and/or wherein the second display content is transferred from the streaming box to the rear-seat entertainment control unit by way of a third cable.

10. The method according to claim 9, wherein the second cable is a LAN cable, a USB cable or an HDMI cable.

11. The method according to claim 9, wherein the third cable is a LAN cable, a USB cable or an HDMI cable.

12. The method according to claim 9, wherein the second cable is the same as the third cable.

13. The method according to claim 7, wherein the second display content is transferred from the data source to the streaming box by way of the wireless local computer network.

14. The method according to claim 13, wherein the wireless local computer network is at least one of WLAN or WiFi.

15. The method according to claim 1, wherein the streaming box is arranged in the transportation apparatus in a fixed or a removable manner.

16. The method according to claim 3, wherein a digitally represented temporal sequence of the touch positions on the touch-sensitive input device is interpreted by way of the streaming box.

17. The method according to claim 3, wherein a digitally represented temporal sequence of the touch positions on the touch-sensitive input device is interpreted by way of a rear-seat entertainment control unit.

* * * * *